Patented Nov. 19, 1946

2,411,172

UNITED STATES PATENT OFFICE 2,411,172

17-ACETYL-17-HYDROXY - PERHYDROCYCLOPENTENOPHENANTHRENES, ANILS, AND OXIMES THEREOF, AND METHOD OF PREPARING THEM

Homer E. Stavely, Highland Park, N. J., assignor to E. R. Squibb & Sons, New York, N. Y., a corporation of New York No Drawing. Application March 22, 1940, Serial No. 325,473

6 Claims. (Cl. 260—397.4)

This invention relates to, and has for its object the provision of, compounds of the group consisting of 17 - acetyl-17-hydroxy-perhydrocyclopentenophenanthrenes—especially 17 - hydroxy-20-keto derivatives of compounds of the pregnane series—anils, and oximes thereof; and a process of preparing them. These compounds, notably $\Delta^5$-pregnendiol-3,17-one-20 and derivatives thereof, are important as precursors of progesterone and compounds similar to the suprarenal cortex hormones, since perhydrocyclopentenophenanthrenes having a hydroxy group in the 3 position are readily oxidized to 3-keto compounds.

In the following description and claims, the nomenclature and numbering system employed is that established by the American Chemical Society monograph Chemistry of Natural Products Related to Phenanthrene by L. F. Fieser, published in 1936 by Reinhold Publishing Corporation, New York city. Thus, by "compounds of the pregnane series" is meant compounds which have the hydrocarbon nucleus of pregnane or pregnene and which may also embody oxy- and/or oxo-substituents.

The compounds of this invention may be prepared by reacting a 17-ethynyl-17-hydroxy-perhydrocyclopentenophenanthrene (e. g. $\Delta^5$-17-ethynyl-androstendiol-3,17, or 17-ethynyl-estradiol) with an anil-forming aromatic amine (e. g., aniline or toluidin) in the presence of a mercuric compound (e. g. mercuric chloride). An excess of anilin may be employed as the reaction medium, in which case, after the reaction has proceeded for a week at room temperature (or for a shorter period at a higher temperature), the excess anilin is removed by steam distillation, and the reaction mixture—consisting of a ketone (e. g. $\Delta^5$-pregnendiol-3,17-one-20) and the corresponding anil—is recovered. The reaction may also be effected in a two-phase solvent system consisting of benzene and water. Separation of the ketone from the anil may be effected by means of Girard's ketone reagent T, or by acetylating the mixture, and separation of the sparingly soluble anil acetate from the much more soluble ketone acetate.

The 17 - ethynyl-17-hydroxy-perhydrocyclopentenophenanthrenes may conveniently be obtained from perhydrocyclopentenophenanthrenes having a nuclear keto group (e. g. dehydroisoandrosterone) by reaction with acetylene in the presence of a tertiary alcoholate, as described in my application Serial No. 228,957, filed September 8, 1938 (now Patent No. 2,239,864, dated April 29, 1941).

The following examples are illustrative of the invention:

Example 1

A mixture of 1 g. $\Delta^5$-17-ethynyl-androstendiol-3,17, 500 mg. mercuric oxide, 0.3 cc. ether-boronfluoride catalyst [J. Am. Chem. Soc., 55, 2858 (1933)] and 5.0 cc. dry anilin is allowed to stand at room temperature for about a week. The excess aniline is then removed by steam distillation, and the residue is cooled and saturated with H$_2$S. After 12–16 hours, the mixture is thoroughly extracted with ether, and the extract is washed with water, dried over sodium sulfate, and evaporated to dryness; on crystallization of the residue from aqueous methanol, 500 mg. of $\Delta^5$-pregnendiol-3,17-one-20-anil is obtained. The product melts at 148° C. Another crystalline modification melting at 185° is obtained by crystallizing from benzene - petroleum - ether. The reaction may also be carried out by substituting mercuric chloride for the mercuric oxide and ether-boron-fluoride catalysts in the foregoing procedure.

The aqueous methanol mother liquor of the anil crystallization, after standing about 10 days, yields another crop of crystals, the product being $\Delta^5$-pregnendiol-3,17-one-20, which sinters at 158° C., and melts at 161–163° C. The melting point may be raised somewhat by removing the last traces of water.

Example 2

3.0 g. $\Delta^5$-17-ethynyl-androstendiol-3,17, 600 mg. mercuric chloride, and 15 cc. water-free anilin are allowed to stand at room temperature for 8 days. Excess anilin is removed by steam distillation, and the aqueous mixture saturated with H$_2$S. After standing for 48 hours the mixture is extracted with ether, the ether is evaporated, and the residue refluxed with aqueous methanol for 28 hours. After cooling and the addition of water, a crystalline precipitate is obtained. The total product is dried and acetylated by reaction with acetic anhydride in pyridin for 12–16 hours at room temperature. The solvent is removed by vacuum distillation, and the residue dissolved in a large volume of methanol; on cooling, 700 mg. of crystalline $\Delta^5$-3-acetoxy-pregnenol-17-one-20-anil is obtained. After recrystallization twice from methanolether, the product melts at 232–234° C. An additional 200 mg. yield may be obtained from the mother liquor.

The mother liquor is concentrated to a small volume, and water is added to form a precipitate. After drying, the precipitate is crystallized from benzene-petroleum-ether; 520 mg. of $\Delta^5$-3-acetoxy-pregnenol-17-one-20 is obtained in the form of crystals, melting at 196–198° C.

Attempted hydrolysis of $\Delta^5$-3-acetoxy-pregnenol-17-one-20 yields, not $\Delta^5$-pregnendiol-3,17-one-20, but an isomeric compound (A) having a six-membered ring in place of the cyclopenteno residue, and nuclear keto, hydroxy and methyl groups in said ring (the provision of which compound is part of the subject-matter of my application Serial No. 325,472, filed simultaneously herewith, now Patent No. 2,357,364, dated September 5, 1944). Thus, on refluxing 50 mg. of the ester with a 3% solution of KOH in methanol for two hours, neutralizing the alkali with $CO_2$, concentrating the solution, adding water, filtering the precipitate, washing with water, and crystallizing from acetone, hexagonal prisms melting at 278–280° C. are obtained; the product is identical with aforementioned compound A.

*Example 3*

500 mg. $\Delta^5$-17-ethynyl-androstendiol-3,17, 900 mg. mercuric chloride (2 moles), 150 mg. anilin (1 mole), 10 cc. benzene, and 10 cc. water are refluxed together for 20 hours. The benzene is removed by steam distillation, and the aqueous mixture is saturated with $H_2S$ and allowed to stand 48 hours. The mixture is then extracted with ether, the ether evaporated, and the dry residue acetylated by reacting with acetic anhydride in pyridin at room temperature for 12–16 hours. The solvent is removed by vacuum distillation, and the acetates of $\Delta^5$-pregnendiol-3,17-one-20 (140 mg.) and the corresponding anil (110 mg.) are separated in the manner detailed in Example 2.

*Example 4*

The reaction is carried out exactly as in Example 3, except that the ketone, $\Delta^5$-pregnendiol-3,17-one-20, is separated from its anil by means of Girard's ketone reagent T. 4.0 g. $\Delta^5$-17-ethynylandrostendiol-3,17 yields 900 mg. of the ketone.

*Example 5*

50 mg. of $\Delta^5$-pregnendiol-3,17-one-20 is acetylated by reaction with acetic anhydride in pyridine for about 12–16 hours. The solvent is removed by vacuum distillation, and the residue is mixed with 50 mg. hydroxylamine hydrochloride, 50 mg. potassium acetate, and 10 cc. ethanol, and heated for about 2 hours. Water is then added, and the precipitate formed is filtered, washed with water, dried, and recrystallized from benzene-petroleum ether. The product, $\Delta^5$-3-acetoxy-pregnenol-17-one-20 oxime, melts at 254–256° C.

*Example 6*

$\Delta^5$-3-acetoxy-pregnenol-17-one-20 is converted into the corresponding oxime by reaction with hydroxylamine hydrochloride as detailed in Example 5. The product melts at 253–256° C., and the mixed melting point with the product of Example 5 shows no depression.

This application is a continuation-in-part of my application Serial No. 246,861, filed December 20, 1938.

The invention may be variously otherwise embodied within the scope of the appended claims.

I claim:

1. The method which comprises reacting a 17-ethynyl-17-hydroxy-perhydrocyclopentenophenanthrene with an anil-forming aromatic amine in the presence of a mercuric-compound catalyst.

2. The method which comprises reacting a 17-ethynyl-17-hydroxy-perhydrocyclopentenophenanthrene with aniline in the presence of a mercuric-compound catalyst.

3. The method of preparing a 17-acetyl-17-hydroxy-perhydrocyclopentenophenanthrene, which comprises reacting a 17-ethynyl-17-hydroxy-perhydrocyclopentenophenanthrene with aniline in the presence of a mercuric-compound catalyst, and recovering the ketone from the reaction mixture.

4. The method of preparing a 17-acetyl-17-hydroxy-perhydrocyclopentenophenanthrene, which comprises reacting a 17-ethynyl-17-hydroxy-perhydrocyclopentenophenanthrene with aniline in the presence of a mercuric-compound catalyst, treating the reaction mixture to convert the anil to the corresponding ketone, acetylating the reaction mixture, and recovering the resulting ketone acetate.

5. The method of preparing a 17-hydroxy-20-keto derivative of a compound of the pregnane series, which comprises reacting the corresponding 17-ethynyl-17-hydroxy compound with an anil-forming aromatic amine in the presence of a mercuric-compound catalyst.

6. The method of preparing $\Delta^5$-pregnendiol-3,17-one-20, which comprises reacting $\Delta^5$-17-ethynyl-androstendiol-3,17 with an anil-forming aromatic amine in the presence of a mercuric-compound catalyst.

HOMER E. STAVELY.